Feb. 4, 1958  C. A. SCHELLENS  2,821,927
CONTROL MECHANISM FOR POWER FLUID SUPPLY
Filed July 15, 1952  2 Sheets-Sheet 1
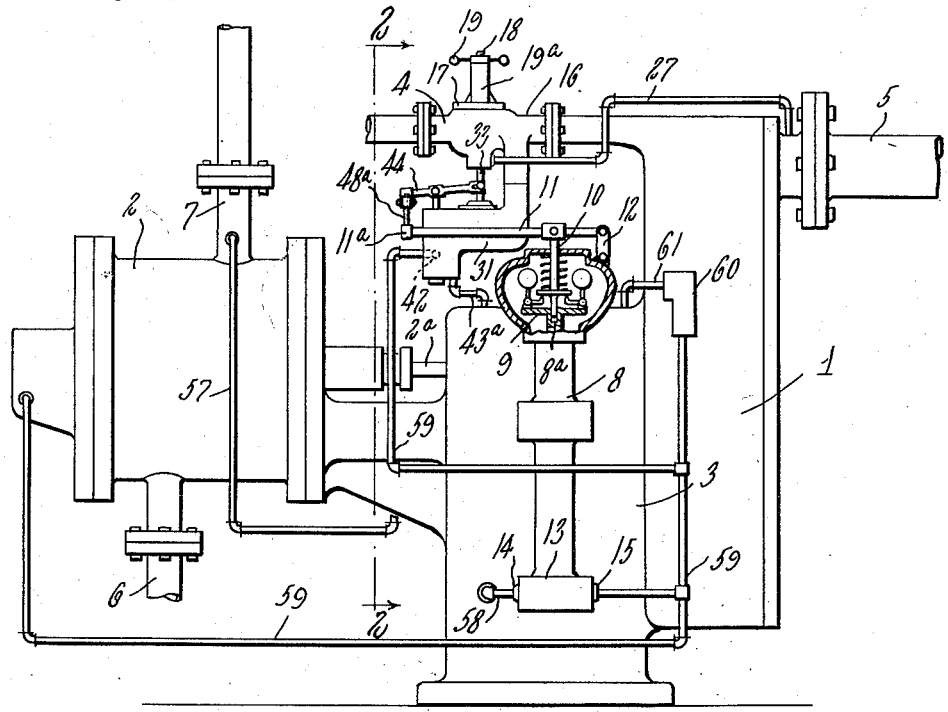
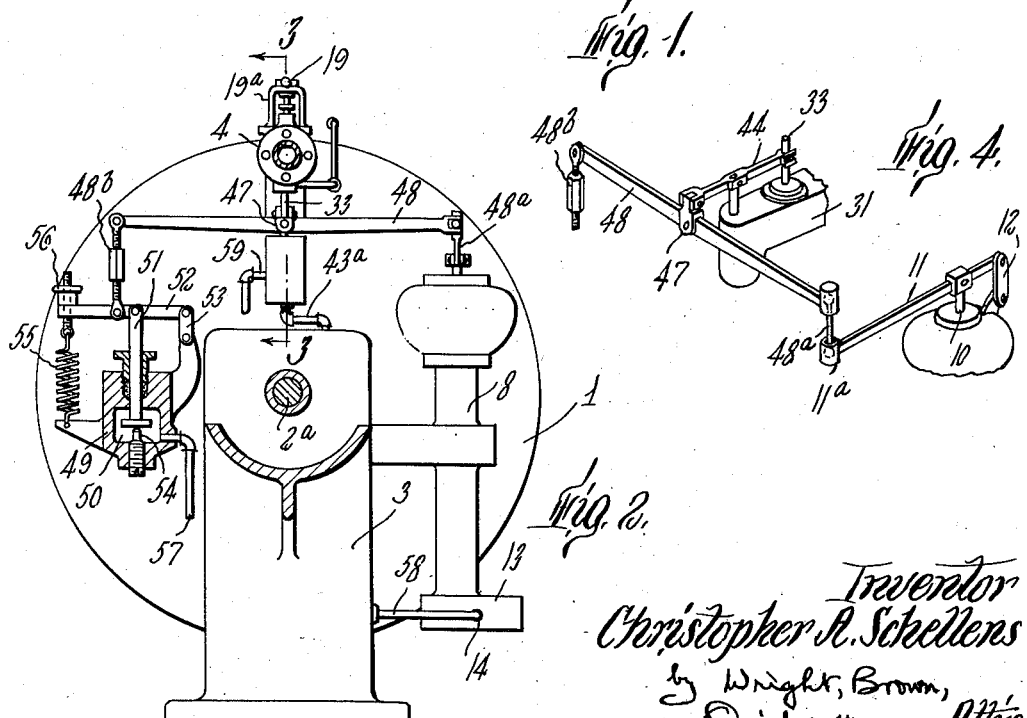
Inventor
Christopher R. Schellens
by Wright, Brown,
Quimby & May Attys.

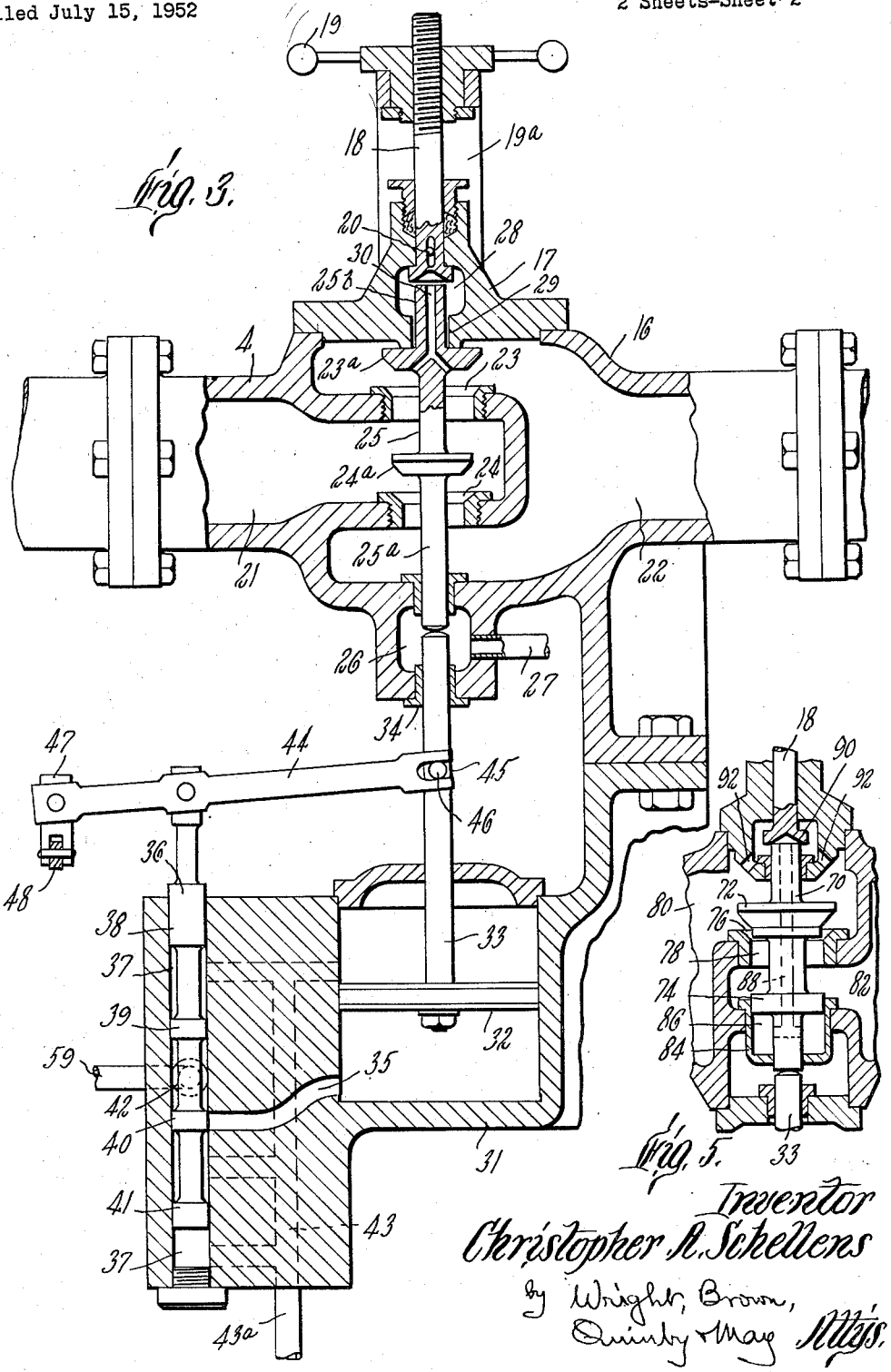

United States Patent Office 2,821,927
Patented Feb. 4, 1958

2,821,927

CONTROL MECHANISM FOR POWER FLUID SUPPLY

Christopher A. Schellens, St. George, Maine; Belton A. Copp, executor of said Christopher A. Schellens, deceased Application July 15, 1952, Serial No. 298,926

6 Claims. (Cl. 103—57)

This invention relates to mechanism for controlling the supply of driving fluid to a turbine. The driving fluid may be any desired liquid or gaseous substance. For convenience the driving fluid is hereinafter referred to as "steam" but it is understood that the invention is not limited to the use of steam.

If the load to which a turbine is operatively connected is lightened or decreased for any reason, the turbine is apt to race and damage itself. To avoid this possibility it is customary to provide, in addition to the usual controls for regulating the admission of steam in accordance with the remanded power output during operation, a separate emergency control for shutting off the supply of steam in case of accidental overspeeding of the rotor. For example, according to present practice, the working control means may consist of a double-disc, balanced valve of the non-seating type not suitable for tight closure. The emergency control means may be a tight-closing stop valve which is biased toward its closing position by a spring and by the pressure of the steam, and which is held open by a latch. The latch is arranged to be tripped by overspeed of the rotor whereupon the valve closes and remains closed until manually reopened and the latch reset.

In some cases there are objections to this system. Thus when the turbine drives a centrifugal pump an overspeed may occur if the flow of liquid to the suction is interrupted. If the plant attendant is not on hand to reset the overspeed trip mechanism a serious interruption of plant operation may occur. Such a loss of suction is usually temporary and the pump could resume work itself without disturbing plant operation were it not that the trip valve requires manual resetting. It is one of the objects of my invention to prevent overspeed in a turbine while permitting automatic resumption of operation when the cause of the overspeed is cured.

An independent trip mechanism on a steam supply valve is generally called upon to operate at infrequent intervals and may in fact never operate during the life of the machine. The valve disc to be operated by such mechanism is surrounded by high pressure steam and must be actuated by means from outside the valve casing through a steam-tight packed joint. Consequently the packed stem tends to corrode and stick to the packing so that when the latch is tripped and the valve is called upon to operate, the strength of the actuating spring is insufficient to move it. Overspeed and consequent damage may result. Hence another object of my invention is to provide overspeed protection mechanism which does not tend to stick when called upon for emergency operation at infrequent intervals.

In accomplishing the above objective I employ a single valve structure of the tight-closing disc type providing both operative control and overspeed protection. A powerful oil relay is provided for the operation of the valve in connection with a pressure feed lubricating system for the bearings. It is another object of my invention to correlate the oil relay to the lubricating system in such a way that the valve automatically closes when the supply of lubricating oil to the bearings fails. The machine will then stop before serious damage to the bearings occurs.

Another object of my invention is to provide manually operable means for opening and tightly closing the valve, this means constituting the normal mechanism employed for placing the machine in operation and shutting it down. Consequently any failure of the valve to close tightly is made evident to the attendant when he attempts to stop the turbine. Steps can then be promptly taken to regrind the valve disc if it has become eroded or to correct any other defect causing the failure of the valve to close tightly. This insures that the control valve is maintained ready and in proper condition to close tightly when called upon to do so by the overspeed protection mechanism.

Further advantageous features of the invention will be apparent from the following description thereof and from the drawings, of which—

Figure 1 is an elevational view of a turbine, a rotary pump driven by the turbine, and control mechanism embodying the invention;

Figure 2 is a section on the line 2—2 of Figure 1;

Figure 3 is a portion of Figure 1 reproduced on a larger scale and partly broken away to show internal members;

Figure 4 is an isometric fragmentary view of a system of floating levers connecting certain parts of the mechanism; and Figure 5 is a sectional view of a modified form of the main control valve.

Referring to the drawings, Figure 1 illustrates a steam turbine 1 connected to a pump 2 by a shaft 2a for direct drive. The turbine has a main casing containing a turbine nozzle and wheel (not shown) and a bearing casing 3 which in this instance forms a sump for draining lubricating oil from the bearings. Steam passes to the nozzles through a control valve 4 and is exhausted through a flanged connection 5. Liquid to be pumped enters the pump 2 through the inlet pipe 6 and is discharged through the discharge pipe 7.

Rotatably mounted in a suitable housing 8 is a vertical shaft 8a which is operatively connected to the shaft 2a by suitable gearing (not shown) or other means for a direct drive. A governor 9 of the spring-loaded flyball type is mounted on the upper end of the vertical shaft 8a. The governor is provided with a spindle 10 which raises a governor lever 11 when the balls are thrown outward. The lever 11 is pivoted at one end to the fulcrum link 12 which is turn is pivoted to a fixed projection on the governor casing. The other end 11a of the governor lever 11 thus moves up and down as the turbine speed increases or decreases and plays its part in the control of the unit as will be described hereinafter.

At the lower end of the housing 8 is a gear pump 13 one of the gears of which is keyed to the shaft 8a so that this shaft drives both the governor 9 and the gear pump 13. This gear pump is a well-known example of the displacement type of pump which delivers a substantially constant stream if driven at a constant rate. The pump has an inlet port 14 and a discharge port 15.

The working parts of the main control valve 4 are illustrated in Figure 3. The valve has a housing 16 with a bonnet 17 through which a vertical, packed spindle 18 extends. A horizontal hand-wheel 19 operable to shut the control valve is in screw threaded engagement with the upper portion of the spindle and is rotatably supported at a fixed level by a frame 19a which extends upward from the bonnet 17. Rotation of the spindle 18 is prevented by a pin 20 which is mounted in the bonnet and projects into a key way in the spindle 18. Hence the spindle can be raised and lowered by rotation of the hand-wheel 19.

The casing 16 encloses a chamber comprising an inner compartment communicating directly with an inlet 21 and an outer compartment communicating directly with a discharge outlet 22, the inner and outer compartments being connected by two coaxial circular ports defined respectively by valve seats 23 and 24. Two discs 23a and 24a are mounted on or integral with the stem of a valve member 25, these discs being spaced from the ends of the stem and from each other to close the ports between the inner and outer compartments when the valve member is in its closed-valve position. The lower end portion 25a of the stem extends from a region of high pressure through a bushing in the valve casing to protrude into a chamber 26 which is in free communication through a pipe 27 with the turbine exhaust, a region of pressure approximately atmospheric. The upper portion 25b of the valve stem extends up into a small chamber 28 in the bonnet, there being a small clearance 29 between the stem and the wall of the opening between the discharge chamber 22 and the small chamber 28. Except as hereinafter described, the chamber 28 is constantly in communication with the inner compartment of the main chamber enclosed by the casing 16 and hence with the main steam pressure in the inlet 21. For this purpose, for example, a drilled hole 30 extends down from the upper end of the stem and opens through the side of the stem at points below the upper valve disc 23a where the ambient pressure is always equal to the main steam pressure. Hence when the bore 30 is unobstructed, the pressure in the chamber 28 is substantially equal to the main steam pressure. The spindle 18 is aligned with the valve stem 25 and its lower end is cupped to engage over and seal the upper end of the valve stem. Thus when the spindle 18 is moved downward by rotation of the hand-wheel 19, it pushes the discs 23a and 24a against their seats and closes the bore 30, completely shutting off steam from the discharge outlet 22.

I prefer to make the upper disc of the valve 25 larger than the lower disc so that the valve can be withdrawn readily from the body and possesses inherent stability, owing to the resulting upward reaction thereon. This reaction is more than counterbalanced by the main or boiler pressure acting on the top of the stem 25b and I select the diameter of 25b large enough to effect a substantial downward force on the valve when it is on its seat. When, on the other hand, the valve is wide open the steam pressure at all points within the housing 16 as well as in the chamber 28 is at main or boiler pressure and the downward reaction is equal to this pressure multiplied by the section area of the stem 25a. I prefer to make the stem portions 25a and 25b of such sizes that the downward reaction is nearly the same when the valve is wide open as it is when the discs are on their seats. Under these conditions the downward reaction at intermediate positions remains almost constant. Since this downward reaction on the valve may be of substantial magnitude, I provide a follow-up mechanism to utilize power for opening the valve. For this purpose I may employ a single-acting motor consisting of an oil relay cylinder 31 bracketed to the valve housing 16 and provided with a piston 32 and a piston rod 33. The upper end of the rod 33 is guided in a closely fitted bushing 34 in the lower floor of chamber 26 and abuts the lower end 25a of valve stem. Oil pressure acting on the lower face of the piston 32 thus tends to open the valve 25, counterbalancing the force of the steam pressure thereon.

Oil is admitted to the lower part of the cylinder 31 and is exhausted therefrom through a port 35, the control thereof being effected by a pilot valve 36 which slides in a cylinder 37 and has lands 38, 39, 40, 41 closely fitting therein, the land 40 normally covering and closing the port 35. Oil under pressure enters the cylinder 37 through a pipe connection 42. The exhaust passage 43 communicates with the upper part of cylinder 31 where it drains any oil that may leak past the piston 32, and with the chamber above land 39 where it drains any oil which may leak past this land, also with the chamber between lands 40 and 41 where it catches the exhaust oil from the lower part of cylinder 31 when the pilot valve 36 is raised sufficiently to uncover the port 35, and with the chamber underneath land 41. The exhaust passage 43 communicates with the bearing casing sump through any suitable means such as a pipe 43a. The exhaust oil pressure is substantially atmospheric.

The pilot valve 36 is pinned to a floating lever 44, which is forked at its right hand end (Figure 1) forming a slide for a crosshead 45 in which is journalled a pin 46, which pin is fixed to the piston rod 33. The left hand end of the lever 44 is pinned to a link 47, which in turn is pinned to a lever 48 (see Figures 2 and 4) at its mid point, the pins being transverse to one another so that lever 44 moves in a plane through the turbine shaft center while the lever 48 moves in a plane transverse thereto.

It is evident from Figure 4 that if either end of the lever 48 is raised or lowered, the other end being stationary, the link 47 will be correspondingly raised or lowered half as much, thus rocking the shaft 44 and changing the rate of steam supply through the control valve. The right hand end of the lever 48 is connected by a link 48a to the end 11a of the governor-operated lever 11, thus providing a linkage by which the governor acts in response to overspeed of the rotor to shut down wholly or partly the steam supply to the turbine. The left hand end of the lever 48 is connected by a link 48b to a control device which is made to be responsive to a selected condition of pressure, temperature or other physical condition, or may be manually operable. In this instance a pressure regulator 49 is used which controls the machine to produce a substantially constant pressure at the discharge end of the pump, the lever motion being responsive to discharge pressure. Included in the regulator 49 is a cylinder 50, a plunger 51 and a lever 52 having its fulcrum at the link 53. The link 48b connects the lever 52 with the lever 48. The plunger 51 may be provided with an enlarged lower end which abuts a plug 54 when in its extreme lower position and abuts the top of the cylinder 50 when in its extreme upper position. The cylinder 50 is in free communication with the discharge of the pump through a pipe 57 (Figures 1 and 2). A spring 55, adjustable for tension by a hand wheel 56 balances the thrust due to the pressure in the cylinder 50 as it acts on the plunger.

The operation of the relay is as follows: Assume that the unit is running under control of the constant pressure governor at a speed below that at which the governor weights fly out. The governor spindle 10 is then at its lowest position and the right hand end of the lever 48 is fixed at its lowest position while the left hand end moves up and down as the load on the pump demands. Assume a momentary drop in the pump delivery pressure due to an increase in volumetric demand, which drop is communicated through the pipe 57 to the cylinder 50 (Figures 1 and 2). The plunger 51 will drop slightly which drop is communicated to the middle point of the lever 48. This depresses the left hand end of the lever 44 and with it the pilot valve 36. The land 40 uncovers the top of the port 35 and admits pressure oil from the pipe connection 42 to the lower side of piston 32, moving it up, and with it the right hand end of the lever 44. This raises the pilot valve until the land 40 is again in the position where it closes off the port 35. The upward motion of the piston 32 raises the valve 25 and admits more steam to the turbine, raising the delivery pressure to that required for equilibrium with the spring 55. Conversely, in the event of a momentary rise in pressure in the pump discharge the pilot valve is initially raised and the land 40 uncovers the lower edge of the port 35 providing communication between the lower part of cylinder 31 and the exhaust port 43. The exhausting of oil lowers the oil pressure acting upward on the piston 32 and permits the steam pressure on the upper end of the valve stem 25b to move the valve 25 downward. The valve will move down until the "follow-up" lever 44 restores the pilot valve 36 to its equilibrium position, in the meantime partially closing the steam passages to the turbine and reducing the pump discharge pressure to its value as determined by the spring 55.

The power follow-up mechanism including the valve 36 and the piston 32 thus employ oil pressure to exert a comparatively large force on the valve 25 in response to a comparatively small force impressed on the lever 44. This is necessary because the forces exerted on the ends of the lever 48 by the control means which acts in response to pressure changes in the pump discharge, and by the governor, are small, whereas the force required to raise the valve 25 against the steam pressure on the upper end of the valve stem is comparatively large since the valve stem is made with a cross-section of sufficient size to ensure that the valve discs are tightly seated by the force of the steam in the chamber 28 acting on the upper end of the stem when the valve is shut.

The speed governor spring is adjusted preferably so that the weights fly out at a speed which is somewhat above the normal operative speed. It therefore plays no part in the control of the unit except under emergency conditions. Imagine for example the effect of a deficiency in the water supply to the pump suction. Water then does not flow to the impeller eye in the same volume as it is discharged and the pump becomes filled with vapor. The discharge pressure drops and the speed increases rapidly. The dropping pressure lowers the plunger 51 which further opens the steam valve and again increases the speed with no increase in pressure. Plunger 51 moves downward until it hits its stop with the steam valve wide open and a rapidly increasing speed. Under these conditions the governor weights fly out when a maximum safe predetermined speed is reached, raising the right hand end of lever 48 which lever now pivots on its left hand end. The center of the lever moves up and, through the above described operation of the relay, closes the steam valve. When the normal supply of water to the pump is restored, normal discharge pressure is also restored and the pressure regulator resumes its function, the governor weights and spindle returning to their original position.

The link 48b is adjustable in length and is adjusted so that when the governor spindle and plunger 51 are both at their lowest positions the steam valve is wide open. The travel ranges of the governor spindle 10 and the plunger 51 are so proportioned in relation to the steam valve travel, taking into account the lengths of the various lever arms, that the steam valve is shut when either the governor spindle or the plunger 51 is at its extreme upper position, the other being on its extreme lower position.

Referring again to Figure 1 and Figure 2 the oil pump 13 draws oil from the sump in the lower part of the bearing casing 3 through a pipe 58 and discharges into the pressure line 59 which supplies oil to the main bearings and to the oil relay described above. The oil pressure in this instance is held at a constant value by means of the spring loaded relief or "dump" valve 60 which is in a by-pass line 61 from the pressure line 59 to the sump in the casing 3, the pressure in the casing being substantially atmospheric. This by-pass returns to the sump the oil from the pump 13 which is in excess of the requirements of the bearings and the piston 32. The pressure in the oil line 59 is therefore controlled by the tension of the spring in the valve 60 and remains substantially constant whatever the flow of oil to the bearings and relay may be.

The proper oil pressure is determined by the net downward force exerted on the valve 25 by the steam pressures acting on its surface and by the diameter of the oil piston 32. Thus a certain oil pressure existing below piston 32 is required to maintain equilibrium of the valve and I prefer to set the relief valve 60 to maintain the oil pressure at about double this value. Assume that this equilibrium pressure is 20 p. s. i. The oil pressure in the pipe 59 would be set at 40 p. s. i. This leaves 40—20 or 20 p. s. i. available for forcing oil through the port opening at the upper edge of the land 40 of the pilot valve as it is lowered. On the other hand if the pilot valve is raised the lower edge of the land 40 establishes a port communicating with the exhaust passage 43, and we have available 20—0 or 20 p. s. i. for exhausting the lower part of cylinder 31. In case the oil supply to the oil pump 13 fails for any cause such as depletion of the supply in the sump or a plugged oil strainer in the oil suction line (not shown), the oil pressure in the line 59 drops. If the pressure drops below 20 p. s. i., the lubricating system still functions properly but there is insufficient pressure below the piston 32 to hold it up, and the steam valve 25 consequently closes. The turbine therefore automatically stops before proper lubrication of the main bearings fails and consequent damage to the bearings is thus avoided.

It is to be understood that although for convenience the mechanism herein described and illustrated has been shown with the parts in a certain relation to one another, various changes may be made in relative sizes and positions without departing from the scope of the invention. For example, the valve and piston assembly can be inverted, putting the piston uppermost, or can be arranged horizontally without materially affecting the interaction of the parts.

While the double-disc control valve 4 can be made so that the discs seat simultaneously and completely shut off the steam flow, as a practical matter it is difficult to finish the valve with the high degree of accuracy in the spacing of the discs necessary for a tight seating of both discs. A variant form of valve is shown in Figure 5, this valve not requiring a high degree of precision in the spacing between the discs. On the valve stem 70 is a valve disc 72 and a balancing piston 74. The valve disc is adapted to engage a seat 76 in the passage 78 through which steam flows from the inlet 80 to the discharge 82 leading to the turbine nozzle. The balancing piston 74 is slidably fitted in a cylinder 84 which encloses a chamber 86. A bore 88 in the valve stem 70 connects the chamber 86 with an auxiliary chamber 90 into which the upper end of the valve stem projects. In line with the valve stem is the spindle 18 which is manually operable, as shown in Figure 3, by rotation of a hand wheel 19. Passages 92 connect the chamber 90 with the inlet 80 so that boiler pressure is always in the chamber 90 and also in the chamber 86 except when the spindle 18 bears on the upper end of the valve stem to shut off the bore 88. The lower end of the valve stem is operatively engaged by the piston rod 33. When the valve 72 is closed by steam pressure on the upper end of the stem in response to a reduction in the upward force of the piston rod 33, some of the steam in the chamber 86 will leak past the balancing piston 74, but not enough to affect to any appreciable degree the drive of the turbine rotor. When however the spindle 18 is operated to close the valve 72, the shut-off is complete and no steam passes to the discharge chamber 82.

Thus it will be seen that in this valve as well as in the preferred form shown in Figure 3, the same valve disc which operatively controls the steam supply to the turbine serves in conjunction with the spindle 18 and the hand wheel 19 as a tight shut-off valve for use when the unit is shut down. A leaky valve disc would make itself evident during the shut-down period, and the proper steps would be taken to correct it so that whenever the disc should be called upon to close by the emergency governor it would be in a proper condition to close tightly.

I claim:

1. In combination with a turbine and a mechanism driven thereby, control mechanism for regulating the steam supply to the turbine, comprising a valve having a casing enclosing a chamber with an inlet and an outlet through which the steam passes to the turbine, a valve member including a stem, an end portion of which protrudes with a sliding fit from a region of high pressure in said casing to a region of atmospheric pressure, said member being movable to vary the steam supply through said chamber from maximum to none, the direction of the valve closing movement being toward the protruding end of said stem, said valve member being shaped and arranged with reference to said casing so that steam pressure in said casing imposes on the valve member in all of its positions a bias of substantially constant force toward its closed position, a single-acting fluid motor including a movable member abutting and pressing against the protruding end of said stem, means supplying fluid at constant pressure to said motor, and means for controlling the admission of fluid to and discharge of fluid from said motor to regulate the position of said valve stem in response to changes in power demand on the turbine by the driven mechanism.

2. Apparatus as in claim 1, said single-acting motor and fluid controlling means therefor including a power follow-up mechanism to prevent over-travel of said abutting member.

3. Apparatus as in claim 1, said means for moving said abutting member being also responsive to excess speed of the turbine.

4. Apparatus as in claim 1, said turbine having bearings, said fluid supplying means comprising a pump of the displacement type, constant-speed driving means for said pump, a by-pass from the discharge of the pump to the suction thereof, an adjustable relief valve in said by-pass, a conduit leading directly from the pump discharge to said single-acting motor, and a branch conduit leading directly from said pump discharge to said bearings.

5. Mechanism as shown in claim 1, said chamber having an inner compartment directly communicating with said inlet, an outer compartment directly communicating with said outlet, and two coaxial circular ports connecting the inner and outer compartments, said valve member including two discs mounted on said stem and spaced from the ends thereof and from each other, said discs forming closures for said ports when the valve member is in its closed-valve position, said casing having a second chamber into which the other end portion of said valve stem protrudes, and means providing free communication between said second chamber and said inner compartment.

6. Apparatus as in claim 5, said means for providing free communication between said second chamber and said inner compartment including a central passage extending into the upper end of said valve stem and opening through the side wall of said stem at a point between said discs, and means extending into said second chamber from outside said casing, said last mentioned means being manually operable to abut said upper end of the valve stem to close off said passage and move said valve member to its closed position.

References Cited in the file of this patent
UNITED STATES PATENTS

| | | |
|---|---|---|
| 265,178 | Swank et al. | Sept. 26, 1882 |
| 560,550 | Smith | May 19, 1896 |
| 589,378 | Tutthill | Aug. 31, 1897 |
| 1,444,437 | Ver Planck | Feb. 6, 1923 |
| 1,471,317 | Emmet | Oct. 16, 1923 |
| 1,617,460 | Schmidt | Feb. 15, 1927 |
| 1,718,673 | Wettstein | June 25, 1929 |
| 1,771,975 | Wendell | July 29, 1930 |
| 1,816,020 | Meyer | July 28, 1931 |
| 2,098,014 | Polston | Nov. 2, 1937 |
| 2,260,576 | Maybach | Oct. 28, 1941 |
| 2,278,992 | Henderson | Apr. 7, 1942 |
| 2,325,814 | Tyler | Aug. 3, 1943 |
| 2,467,445 | Schwendner | Apr. 19, 1949 |
| 2,711,071 | Frankel | June 21, 1955 |